US011870958B2

United States Patent
Motoyama et al.

(10) Patent No.: US 11,870,958 B2
(45) Date of Patent: Jan. 9, 2024

(54) READING DEVICE SETTING READING START POSITION BY READING REFERENCE HOLE HAVING L-SHAPE

(71) Applicant: BROTHER KOGYO KABUSHIKI KAISHA, Nagoya (JP)

(72) Inventors: Toshiki Motoyama, Konan (JP);
Yoshihiro Oyama, Tokai (JP);
Yoshihiro Okamoto, Komaki (JP);
Kazushi Shumiya, Konan (JP);
Kentaro Aoyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/563,683

(22) Filed: Dec. 28, 2021

(65) Prior Publication Data
US 2022/0210286 A1 Jun. 30, 2022

(30) Foreign Application Priority Data
Dec. 29, 2020 (JP) .................................. 2020-219803

(51) Int. Cl.
*H04N 1/00* (2006.01)
*H04N 1/047* (2006.01)
(Continued)

(52) U.S. Cl.
CPC ..... *H04N 1/00816* (2013.01); *H04N 1/00819* (2013.01); *H04N 1/02835* (2013.01);
(Continued)

(58) Field of Classification Search
CPC ........... H04N 1/00816; H04N 1/00819; H04N 1/02835; H04N 1/0313; H04N 1/047;
(Continued)

(56) References Cited

U.S. PATENT DOCUMENTS 5,144,455 A * 9/1992 Stein ...................... H04N 1/047
358/443
6,470,099 B1 * 10/2002 Dowdy ................ G06V 10/245
358/488
(Continued)

FOREIGN PATENT DOCUMENTS

CN 1396557 A * 2/2003
JP H04-094858 U 8/1992
(Continued)

*Primary Examiner* — Chad Dickerson
(74) *Attorney, Agent, or Firm* — Scully, Scott, Murphy & Presser, PC

(57) ABSTRACT

In a reading device, a light transmissive member has a front surface on which an original is placed. A peripheral member is adjacent to the light transmissive member, and includes a back surface in which a reference hole is formed. The reference hole includes a first edge and a second edge intersecting with each other. A reading sensor faces the back surface of the light transmissive member and the back surface of the peripheral member. The controller controls the reading sensor to read a reading range including the reference hole to obtain a read image, and determines a reference position in the reading range based on the read image. The reference position is determined to an intersection between the first edge and the second edge. The controller sets a reading start position based on the reference position.

13 Claims, 11 Drawing Sheets

(51) Int. Cl.
  *H04N 1/10* (2006.01)
  *H04N 1/028* (2006.01)
  *H04N 1/031* (2006.01)
  *H04N 1/04* (2006.01)

(52) U.S. Cl.
  CPC ........... *H04N 1/0313* (2013.01); *H04N 1/047* (2013.01); *H04N 1/1035* (2013.01); *H04N 1/1043* (2013.01); *H04N 1/1061* (2013.01); *H04N 2201/0081* (2013.01); *H04N 2201/0472* (2013.01); *H04N 2201/04751* (2013.01)

(58) Field of Classification Search
  CPC .. H04N 1/1035; H04N 1/1043; H04N 1/1061; H04N 2201/0081; H04N 2201/0472; H04N 2201/04751
  USPC ...... 358/1.5, 1.18, 3.32, 406, 504, 488, 484, 358/498
  See application file for complete search history.

(56) References Cited

U.S. PATENT DOCUMENTS

| | | | | |
|---|---|---|---|---|
| 2008/0225357 | A1* | 9/2008 | Ohara | H04N 1/1017 358/498 |
| 2011/0075229 | A1* | 3/2011 | Fujiwara | H04N 1/00002 358/488 |

FOREIGN PATENT DOCUMENTS

| | | |
|---|---|---|
| JP | 2002-354206 A | 12/2002 |
| JP | 2002-354207 A | 12/2002 |
| JP | 2008-227971 A | 9/2008 |
| JP | 2016177250 A * | 10/2016 ........... H04N 1/0032 |

* cited by examiner

FIG. 4
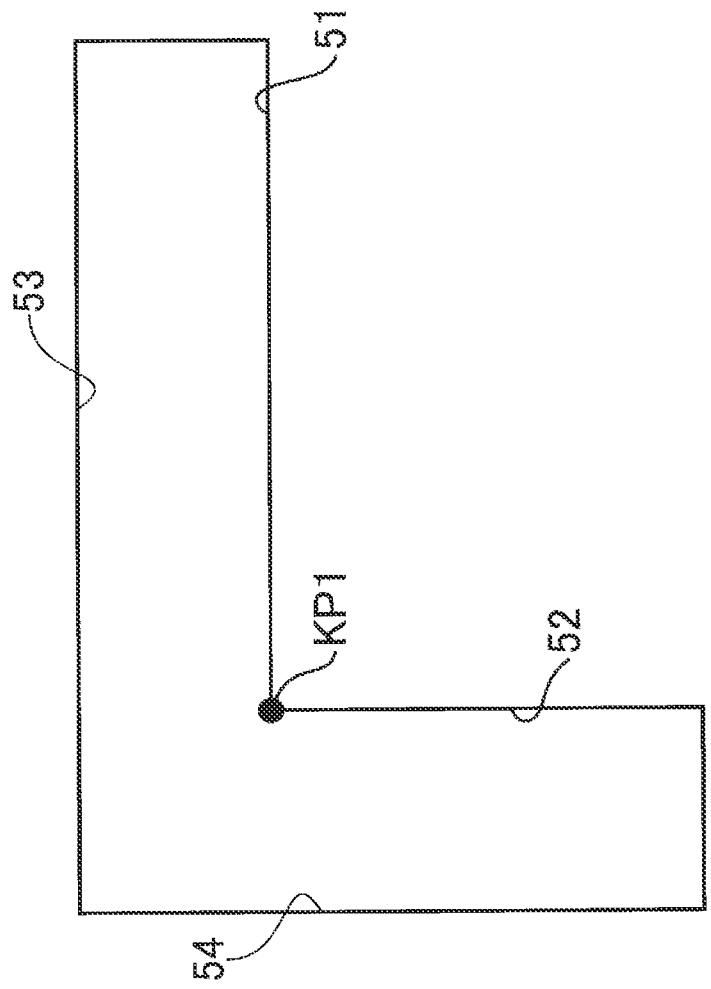
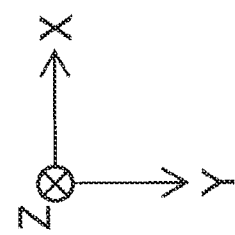

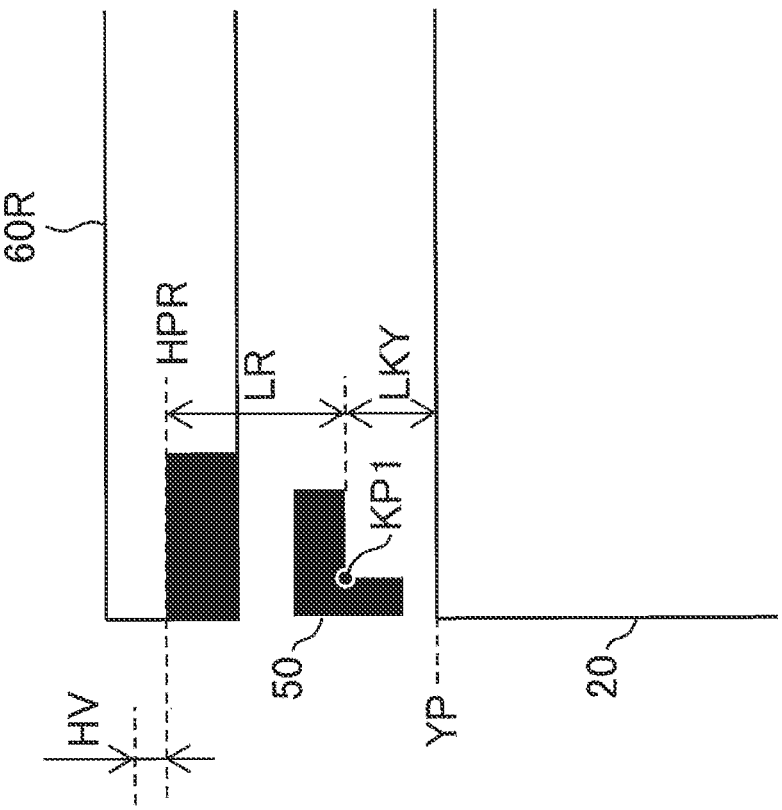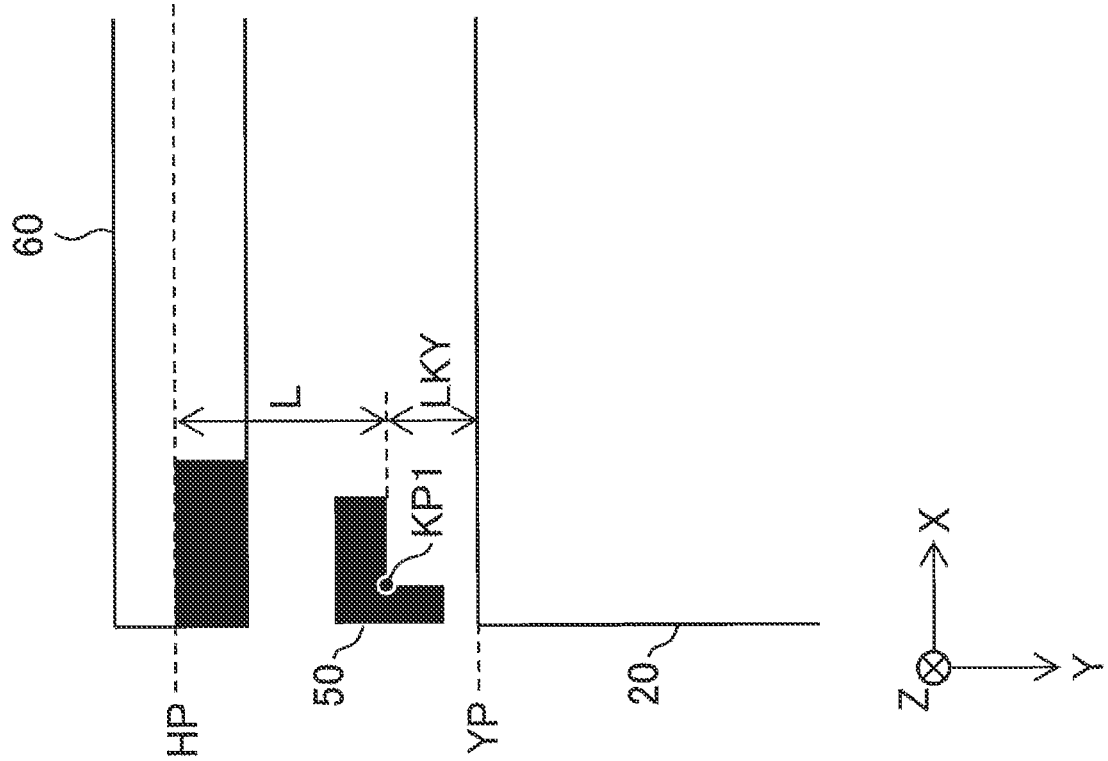

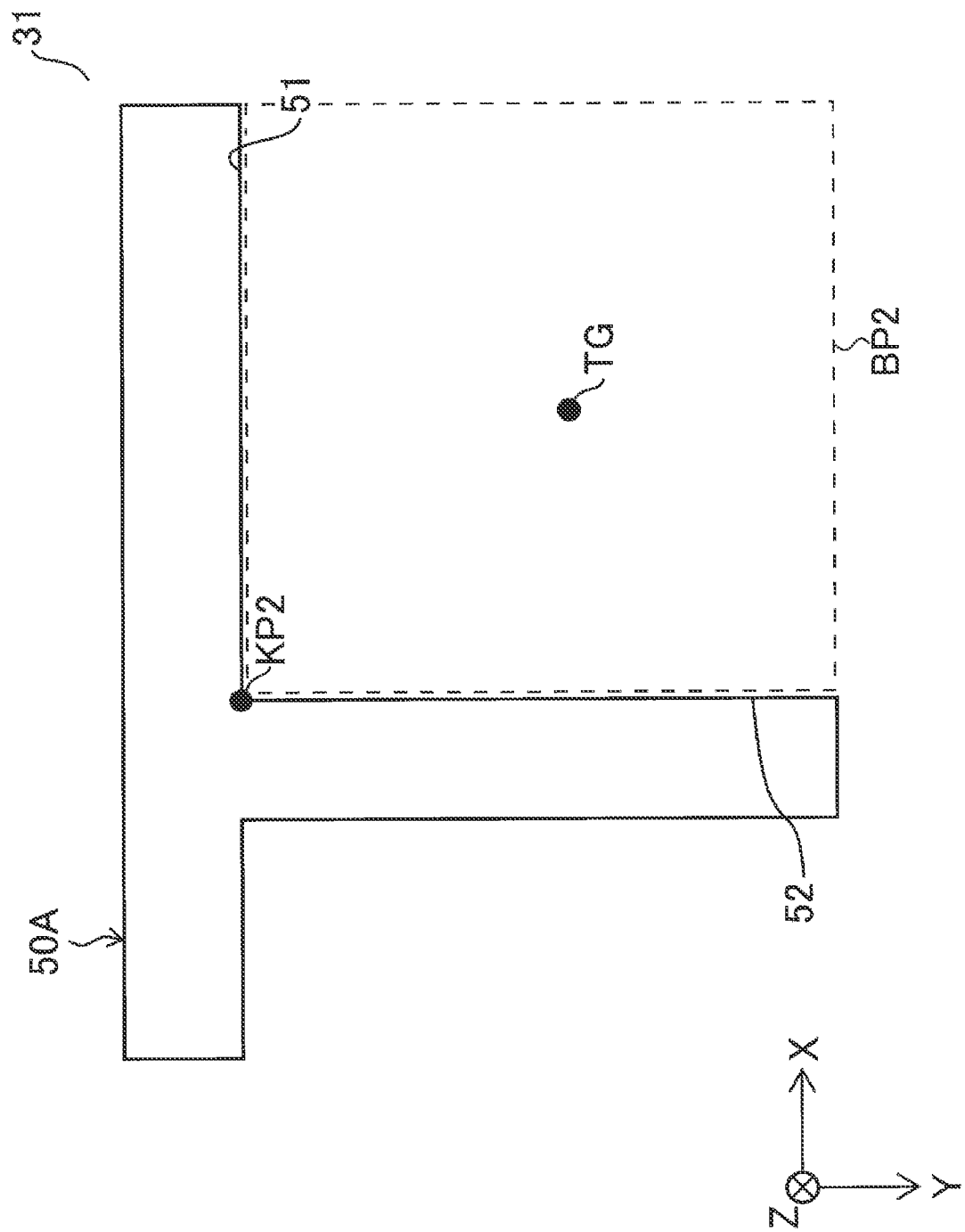

READING DEVICE SETTING READING START POSITION BY READING REFERENCE HOLE HAVING L-SHAPE

CROSS REFERENCE TO RELATED APPLICATION

This application claims priority from Japanese Patent Application No. 2020-219803 filed Dec. 29, 2020. The entire content of the priority application is incorporated herein by reference.

BACKGROUND

A conventional flatbed type reading device capable of reading an original includes a reading portion located below a light transmissive portion on which the original is placed. The reading portion can read one line worth of image extending in a main scanning direction, and move in a sub scanning direction.

In the conventional reading device, a tape is provided in a bottom of a peripheral portion located adjacent to a light transmissive portion. The tape has a black region and a white region. By reading the tape using the reading portion, the reading device determine a home position which is a position of an origin for the reading portion. A reading start position, which is Apart from the home position by a prescribed distance in the sub scanning direction, is deviated from a designed position because the tape is affixed to the peripheral portion when the reading device is manufactured. To address this problem, the conventional reading device is provided with a reference hole having a rectangle shape, reads the reference hole, and calibrates the reading start position based on an edge of the read reference hole.

One example of such the conventional reading devices includes an original transparent platen on which an original is placed, a reading portion to read the original on the original platen, a reference position specifying plate having a reference mark hole. The reference mark hole has a rectangular shape having a first edge parallel to an orthogonal direction to a prescribed direction and a second edge parallel to the prescribed direction.

SUMMARY

However, in the conventional reeling device described above, it is required to read an outer edge of the reference hole and a periphery of the outer edge by using the reading portion in order to specify the edge of the reference hole as a reference. Thus, a part having the periphery of the outer edge of the reference hole need to have a sufficiently large size to satisfy the requirement described above.

It is an object of the present disclosure to provide a technology to reduce a size of a reading device while improving accuracy to specify a reading start position of an original.

In order to attain the above and other objects, the disclosure provides a reading device. The reading device includes a light transmissive member, a peripheral member, a reading sensor, and a controller. The light transmissive member has a front surface on which an original is placed, and a back surface. The peripheral member is located adjacent to the light transmissive member. The peripheral member includes a back surface in which a reference hole is formed. The reference hole has an angled-shape. The reference hole includes an inside edge including a first edge and a second edge intersecting with each other at an angle to define an inside part of the angled-shape of the reference hole. The reading sensor is provided to face the back surface of the light transmissive member and the back surface of the peripheral member. The reading sensor is configured to read an image while moving over a range including the light transmissive member and the peripheral member. The controller configured to perform: controlling the reading sensor to read a reading range including the reference hole to obtain a read image; determining a reference position in the reading range based on the read image obtained in the controlling, the reference position being determined to an intersection between the first edge and the second edge; and setting a reading start position based on the reference position in the reading range, the reading start position being a position from which the reading sensor starts moving when the reading sensor reads the original. Accordingly, a size of the reading device can be reduced while accuracy to specify a reading start position of an original can be improved.

According to another aspect, the disclosure provides a reading device. The reading device includes a light transmissive member, a peripheral member, a reading sensor, and a controller. The light transmissive member has a front surface on which an original is placed, and a back surface. The peripheral member is located adjacent to the light transmissive member. the peripheral member including a back surface in which a first reference hole and a second reference hole are formed. The first reference hole includes a first edge. The second reference hole includes a second edge. An extended line of the first edge and an extended line of the second edge intersect with each other at an angle to form an angled-shape. The reading sensor is located to face the back surface of the light transmissive member and the back surface of the peripheral member. The reading sensor is configured to read an image while moving over a range including the light transmissive member and the peripheral member. The controller is configured to perform: controlling the reading sensor to read a reading range including the reference hole to obtain a read image; determining a reference position based on the read image obtained in the controlling, the reference position being determined to an intersection between the extended line of the first edge and the extended line of the second edge; and setting a reading start position based on the reference position in the reading range, the reading start position being a position from which the reading sensor starts moving when the reading sensor reads the original. Accordingly, a size of the reading device can be reduced while accuracy to specify a reading start position of an original can be improved.

BRIEF DESCRIPTION OF THE DRAWINGS

The particular features and advantages of the disclosure as well as other objects will become apparent from the following description taken in connection with the accompanying drawings, in which:

FIG. 4 is a schematic diagram illustrating a configuration of a reference hole formed in a back surface of a peripheral member provided in the reading device;

FIG. 5A is an explanatory diagram illustrating a distance between a home position and a reference point in a sub scanning direction in the actual reading device;

FIG. 5E is an explanatory diagram illustrating a distance between a home position and a reference point in the sub scanning direction in a designed reading device;

FIG. 10 is a schematic diagram illustrating a configuration of a reference hole formed in a back surface of a peripheral member provided in a reading device.

DETAILED DESCRIPTION

First Embodiment

Overview for Configuration of Reading Device 1

Figure 1:
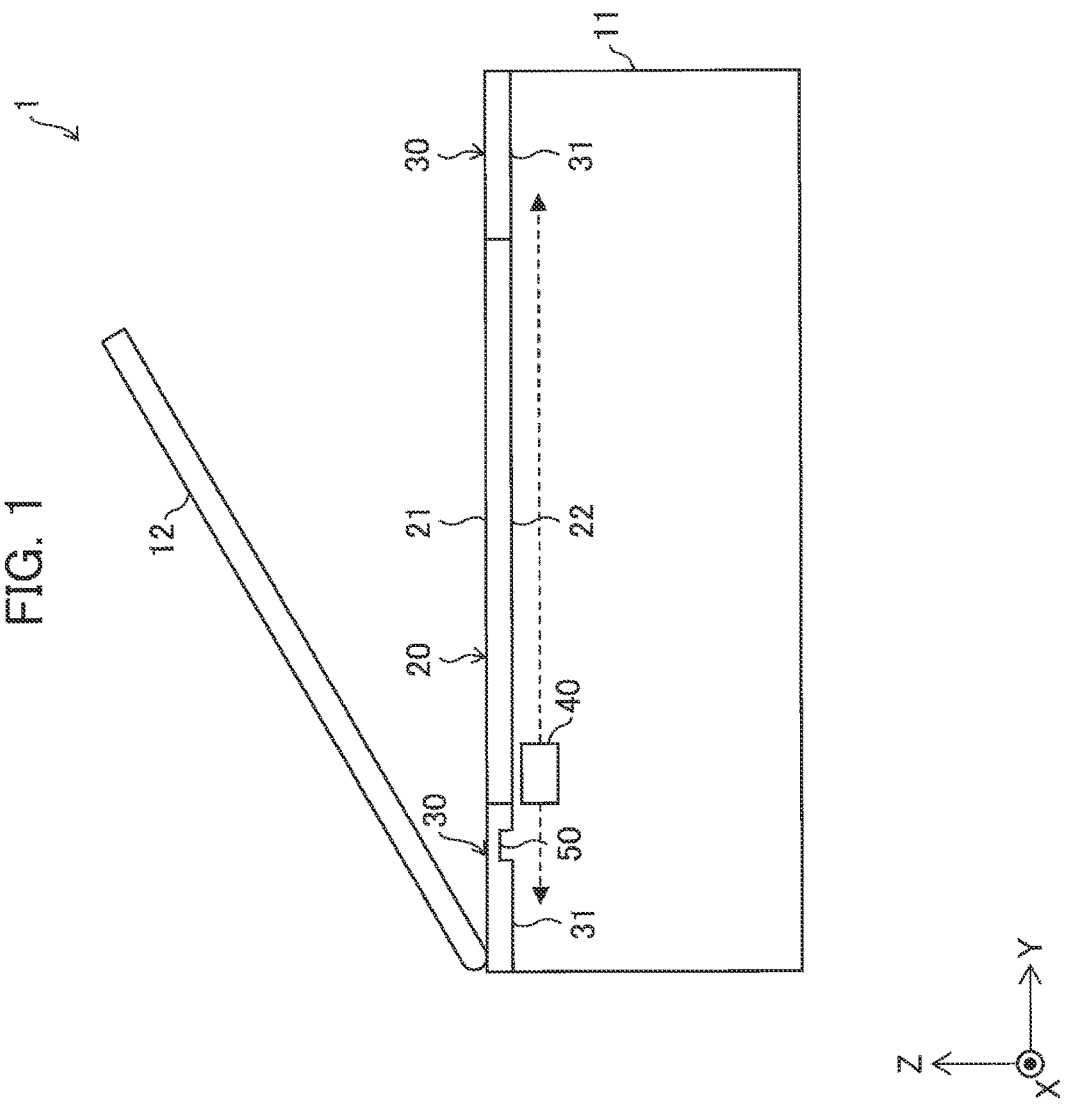
FIG. 1 is a cross section illustrating a flatbed type reading device.
Figure 2:
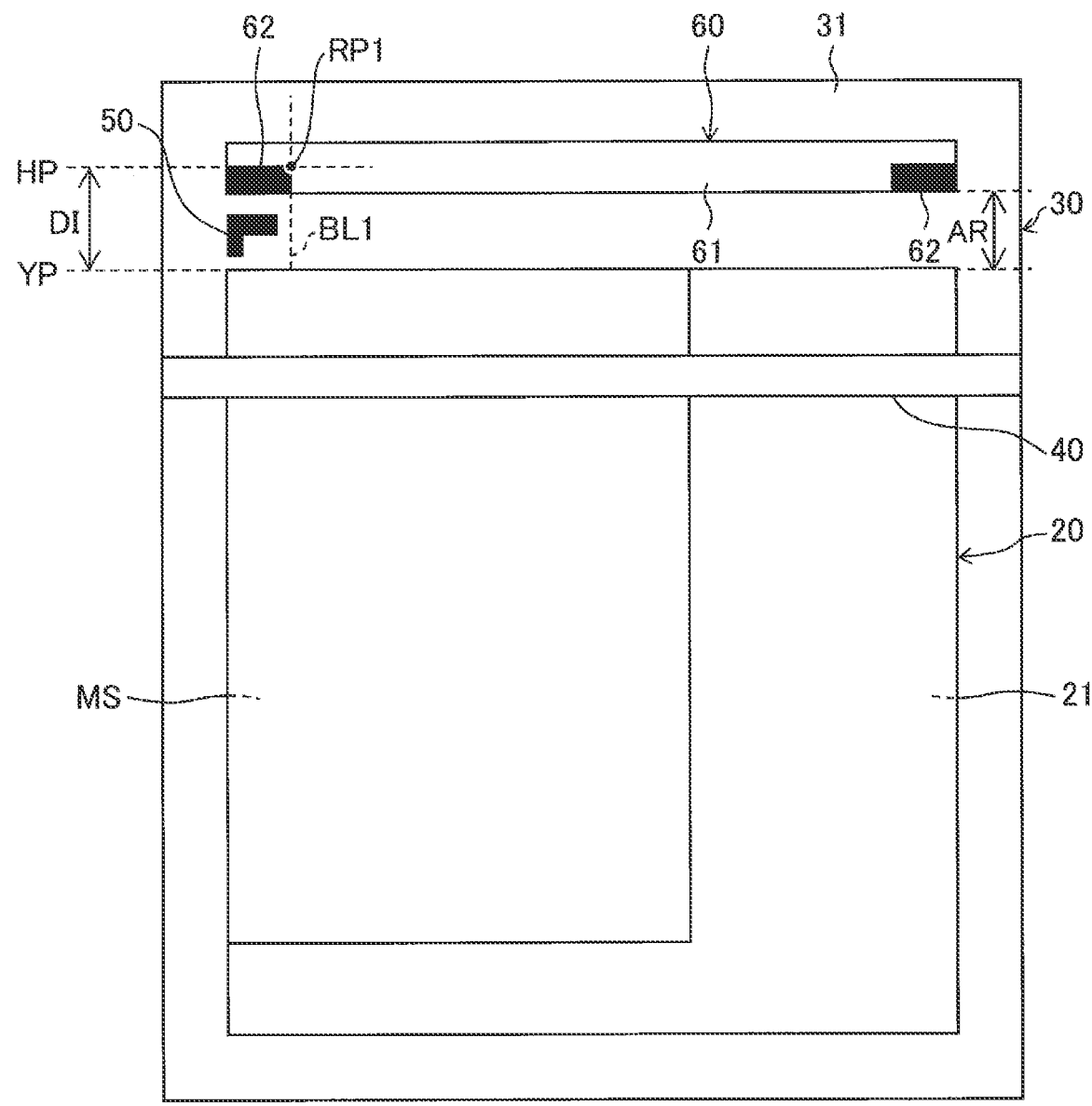
FIG. 2 is an explanatory diagram illustrating a light transmissive member seeing from a main body of the reading device.

FIG. 1 is a cross section illustrating a flatbed type reading device 1 according to a first embodiment. FIG. 2 is an explanatory diagram illustrating a light transmissive member 20 seeing from a main body 11 of the reading device 1.

As shown in FIG. 1, the reading device 1 includes the main body 11, a document cover 12, the light transmissive member 20, a peripheral member 30, a Contact image Sensor (CIS) 40 (an example of the reading sensor assembly). The reading device 1 may include a Charge Coupled Device (CCD) as an example of the reading sensor assembly instead of the CIS 40. The document cover 12 is connected to the main body 11 so that the document cover 12 can pivotally rotate.

The light transmissive member 20 is located on a top of the main body 11. As shown in FIG. 2, an original MS is placed on a front (top) surface 21 of the light transmissive member 20. The light transmissive member 20 is a tabular portion made of transparent material, such as a glass plate. That is, the light transmissive member 20 is a platen glass made of a transparent plate, and the original MS to be read is placed on the platen glass. The platen glass of the light transmissive member 20 has a rectangular shape whose periphery has two edges extending in an X direction (main scanning direction), and two edges extending in a Y direction (sub scanning direction). In a state that the document cover 12 is closed to cover the main body 11, the light transmissive member 20 is covered by the document cover 12.

The peripheral member 30 is provided to surround the periphery of the light transmissive member 20. That is, the peripheral member is a frame that supports and surrounds the periphery of the platen glass of the light transmissive member 20. The peripheral member 30 is located next to and in contact with the light transmissive member 20. The peripheral member 30 is located on the top of the main body 11. A reference hole 50 is formed in a back (bottom) surface 31 of the peripheral member 30. Here, the hack surface 31 of the peripheral member 30 is a bottom surface of the peripheral member 30. The reference hole 50 is a concave formed in the back surface 31. Further, a reference member 60 is formed in the back surface 31. The reference member 60 is a tape affixed on the back surface 31 and extending in the X direction. Because the reference member 60 is taped on the back surface 31 when the reading device 1 is manufactured, there is a possibility that manufacturing error may exist in the taped position of the reference member 60.

The reference member 60 includes a white region 61, which occupies a major part, and two black regions 62 different from the white region 61, The black region 62 is formed at each of both end portions of the reference member 60 in the X direction. The black region 62 is formed at a corner in a forward direction of the Y direction in each of the end portions. According to this configuration, each black region 62 is in contact with the white region 61 in a vicinity of a corresponding one of both ends of the reference member 60 in the X direction so that a boundary therebetween has an L shape line having a line segment extending in the X direction and a line segment extending in the Y direction.

The reading device 1 reads the reference member 60 by using the CIS 40 to detect boundary between the white region 61 and the black region 62. The detected boundary is set as a home position HP in the reading device 1. The home position HP is a position or coordinate of an origin when the CIS 40 moves in a sub scanning direction (the Y direction). Because the CIS 40 moves in the Y direction, as shown in FIG. 2, the home position HP is a position in the Y direction and is represented only by the Y coordinate.

Figure 8:
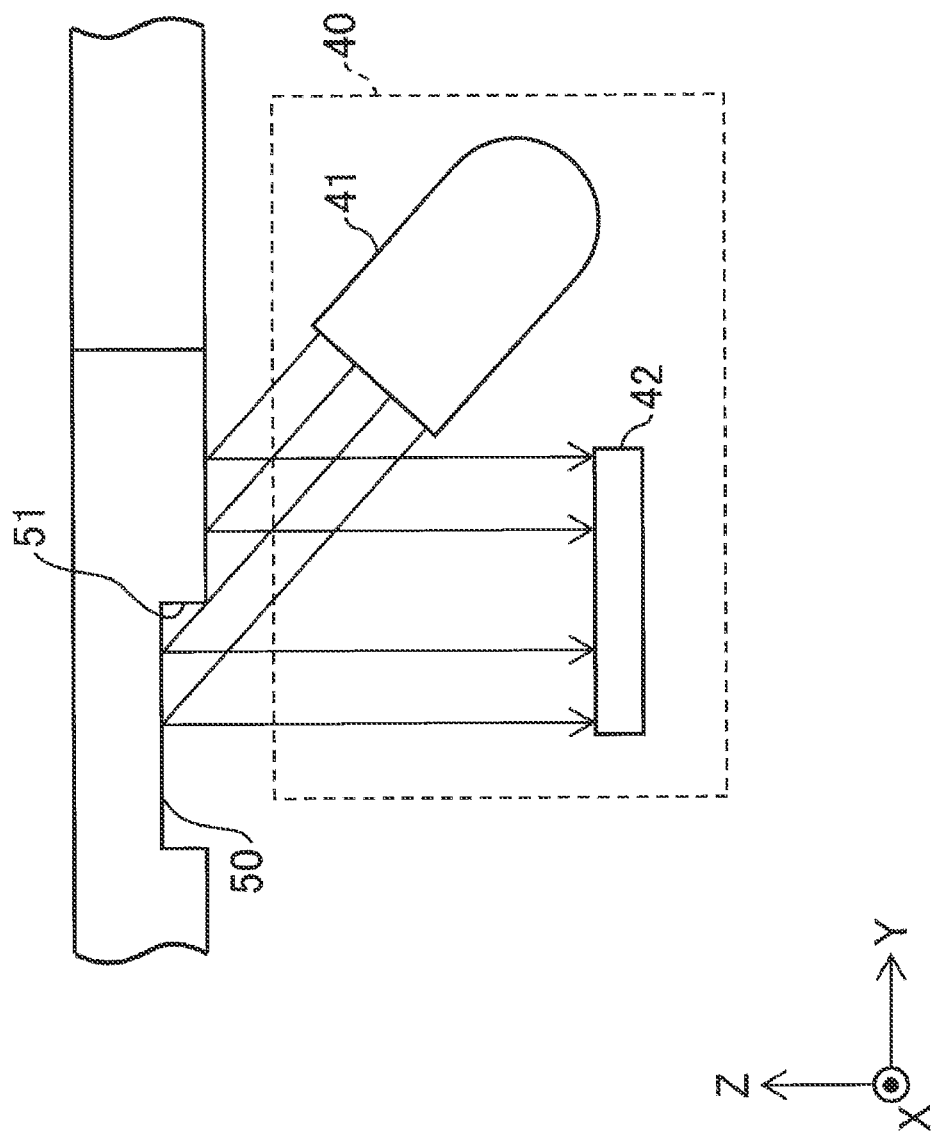
FIG. 8 is a cross section illustrating a state that the reference hole is irradiated by light propagating in an inclined direction from a light source included in a CIS.

The CIS 40 is located to face a back (bottom) surface 22 of the light transmissive member 20 and the back surface 31 of the peripheral member 30. In other words, the CIS 40 is located in a space below both the back surface 22 and the back surface 31. The CIS 40 is movable over a region including the light transmissive member 20 and the peripheral member 30 in the Y direction (the sub scanning direction). As shown in FIG. 8, the CIS 40 includes a light source (not shown), a light guide 41, and a plurality of photoelectric conversion elements 42.

The light source includes Light Emitting Diodes (LEDs) for three colors red, green, and blue. The light guide 41 is made of transparent material and propagates light emitted from the light source, and extends in the X direction orthogonal to the sub scanning direction. In other words, the light source is configured to emit light of each of three colors of red, blue, and green. The light source is located at one end side of the light guide 41 in the main scanning direction. The light guide extends in the main scanning direction and is configured to guide emitted light from the light source in the main scanning direction.

The plurality of photoelectric conversion elements 42 is arranged in a line in a main scanning direction, which is the same as the X direction, to configure a line sensor. The light is emitted from the light source, passes through the light guide 41, is irradiated toward a reading target object, and is reflected by the reading target object. The reflected light enters the photoelectric conversion elements 42. In other words, the line sensor extends in the main scanning direction and is configured to read reflection light of the light of each color emitted from the light source. Each photoelectric conversion element 42 converts the incident light to electric signal, and the electric signal is converted to image data having a density of 8 bits (one of 0-255) for a corresponding pixel by an Analog-to-Digital conversion circuit (not shown). Accordingly, one line worth of reading is performed by the CIS 40. The CIS 40 can read the peripheral member 30 and the original MS putted on the light transmissive member 20 while the CIS 40 moves in the sub scanning direction which is the same as the Y direction below the peripheral member 30 and light transmissive member 20, and emits light toward the peripheral member 30 and the original MS located on the light transmissive member.

Electrical Configuration of Reading Device 1

Figure 3:
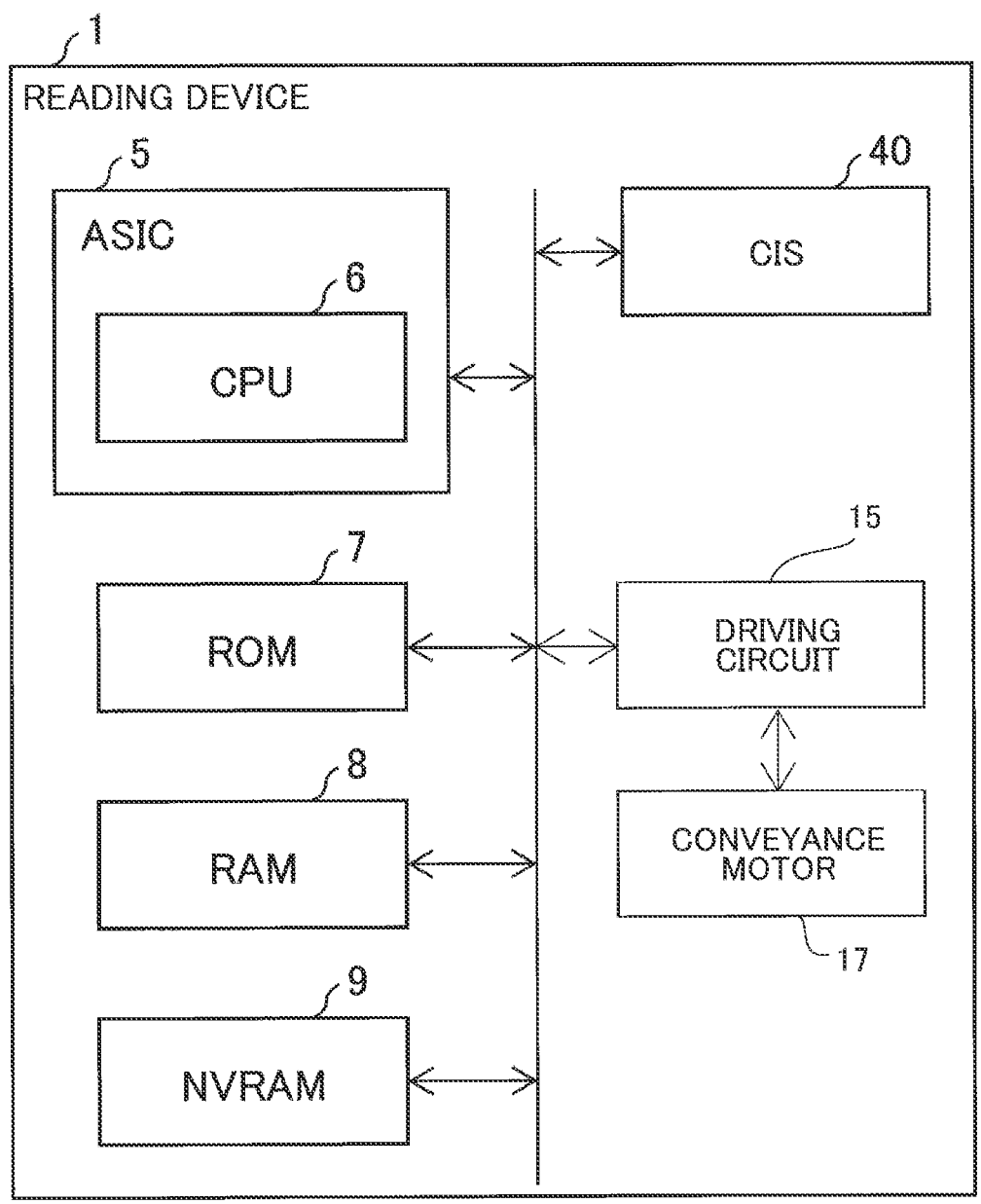
FIG. 3 is a block diagram illustrating an electrical configuration of the reading device.

FIG. 3 is a block diagram illustrating electrical configuration of the reading device 1, The reading device 1 includes an Application Specific Integrated Circuit (ASIC) 5, a Read Only Memory (ROM) 7, a Random Access Memory (RAM) 8, a Non-Volatile Random Access Memory (NVRAM) 9, a driving circuit 15, and a conveyance motor 17 for moving the CIS 40.

The ASIC 5 includes a Central Processing Unit (CPU) 6. The CPU 6 performs processes according to programs read from the ROM 7, and controls components in the reading device 1 while storing results of the processes in the RAM 8 or the NVRAM 9. The CPU 6 is an example of the controller. The ASIC 5 is electrically connected to the CIS 40, the ROM 7, the RAM 8, and the NVRAM 9.

The ROM 7 stores various programs such as programs for controlling components in the reading device 1. The ROM 7 is a nonvolatile memory. When the CPU 6 executes each program, the RAM 8 is a nonvolatile memory used as a working area and a temporary storage area for data. The NVRAM 9 is a rewritable nonvolatile memory. The ROM 7, the RAM 8, and the NVRAM 9 are examples of the storage. The driving circuit 15 is connected to the conveyance motor 17. The driving circuit 15 drives the conveyance motor 17 according to a driving command transmitted from the CPU 6. Specifically, the driving circuit 15 rotates the conveyance motor 17 according to a rotational amount and a rotational direction designated by the driving command. When the conveyance motor 17 rotates a certain amount, a conveyance roller (not shown) rotates by a certain degree to move the CIS 40 in the sub scanning direction.

Configuration of Reference Hole 50

FIG. 4 is a schematic diagram illustrating a configuration of a reference hole 50 formed in the back surface 31 of the peripheral member 30 provided in the reading device 1. As shown in FIG. 4, the reference hole 50 has an angled-shape seeing from the top. That is, in the embodiment, the reference hole has an L-shaped groove in a concave form with an open top. The reference hole 50 includes a first edge 51 and a second edge 52 to form an inside edge of the L-shape of the reference hole 50. Here, the intersection angle formed by the L-shape of the reference hole 50 is a substantially right angle. However, the intersection angle may be an acute angle or an obtuse angle. In other words, in the present disclosure, an L-shape (or an angled-shape) signifies two lines (or line segments) intersecting with each other at a right angle, an acute angle, or an obtuse angle. The reference hole 50 further includes a third edge 53 and a fourth edge 54 to form an outside edge of the L-shape of the reference hole. In other words, the inside edge and the outside edge define respective L-shape outlines of the reference hole 50. The inside edge is smaller than the outside edge. The first edge 51 and the second edge 52 intersect with each other at a right angle in the embodiment. An intersection point between the first edge 51 and the second edge 52 is a reference point KP1. As described later, the reading device 1 determines coordinates of the reference point KP1 from the home position HP by reading a reading range AR (FIG. 2) including the reference hole 50 by using the CIS 40.

Deviation of Actual Home Position in Reading Device 1 from Designed Home Position FIG. 5A is an explanatory diagram illustrating a distance L between the home position HP and the reference point KP1 in the sub scanning direction (the Y direction) in the actual reading device 1. FIG. 5B is an explanatory diagram illustrating a distance LR between a home position HPR and a reference point KP1 in the sub scanning direction (the Y direction) in a designed reading device 1. As shown in FIGS. 5A and 5B, a calibration value HV is a difference between the distance L and the distance LR.

The reference hole 50 is a hole formed in the peripheral member 30 which is a resin molded member. There is little deviation in the position between the peripheral member 30 in the actual reading device 1 and the peripheral member 30 in the designed reading device 1.

Since the reference member 60 is taped on the peripheral member 30, there is a possibility that the position of the reference member 60 in the actual reading device 1 is deviated from a position of the reference member 60 in the designed reading device 1. This deviation is the difference between the distance L and the distance LR, and is specified as the calibration value HV.

The home position HP is the origin used when the CIS 40 moves in the sub scanning direction (the Y direction). The home position HP is represented by a value "0" as the Y coordinate. For example, in a case that the reading device 1 reads the original MS from a reading start position YP, which is an edge portion of the light transmissive member 20, by using the CIS 40, the reading device 1 cannot perform reading operation precisely from an end portion of the light transmissive member 20 if the home position HP is deviated from the designed position.

Calculation Process for Calibration Value by Reading Device 1

Figure 6:
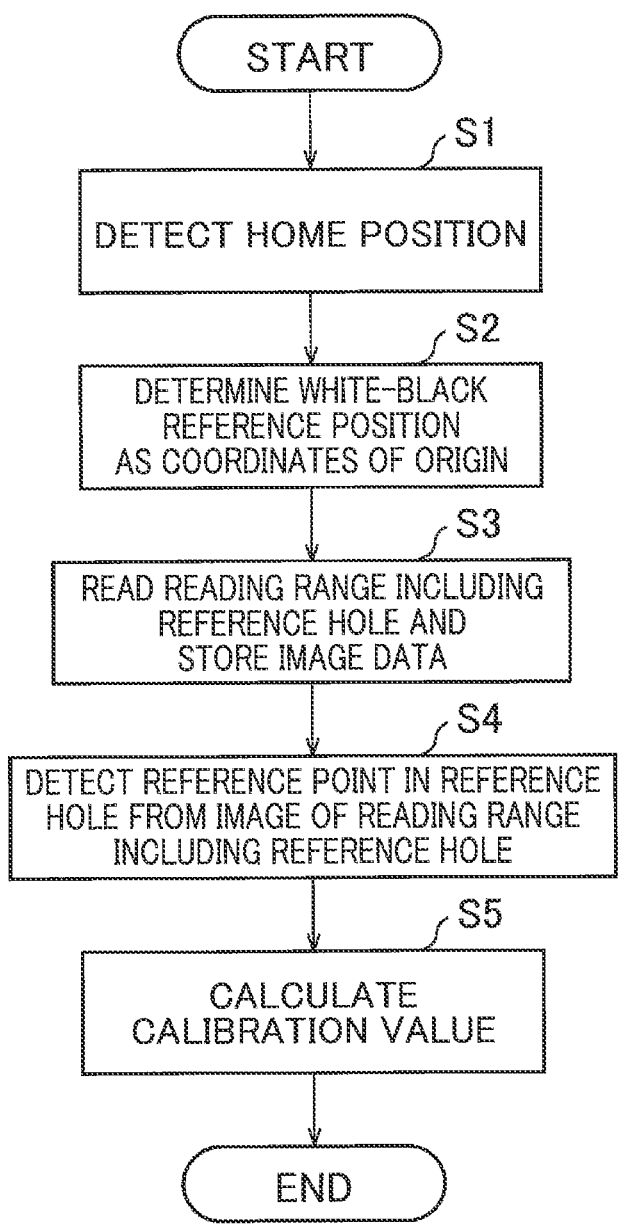
FIG. 6 is a flowchart illustrating a calculation process for calculating a calibration value executed by the reading device.

FIG. 6 is a flowchart illustrating a calculation process for calculating the calibration value HV executed by the reading device 1.

In S1 the CPU 6 detects the home position. When detecting the home position, the CPU 6 executes the following processes. That is, the CPU 6 controls the CIS 40 to move to a position in the peripheral member 30 closer to the outer end portion of the peripheral member 30 than the reference member 60 to the outer end portion. In this example, the CPU 6 controls the CIS 40 to move to the position in the peripheral member 30 which is upstream of the reference member 60 in the Y direction. Subsequently, while the CPU 6 controls the CIS 40 to move from that position in the sub scanning direction (the Y direction), the CPU 6 controls the CIS 40 to read the peripheral member 30 on a line-by-line basis. The CPU 6 detects the home position HP, which is a boundary of the white region 61 and the black region 62, from an image obtained by reading the white region 61 and the black region 62 using the CIS 40.

In S2 the CPU 6 determines (or sets) a white-black reference position RP1 as the coordinates (X=0, Y=0) of the origin based on the position of the read white region 61 and the position of the read black region 62. As shown in FIG. 2, the white-black reference position RP1 is an intersection point between a boundary line BL1 and a horizontal line passing the home position HP. Here, the boundary line BL1 is a boundary between the white region 61 and the black region 62 with respect to the X direction, and the horizontal line passing the home position HP is a boundary line between the white region 61 and the black region 62 with respect to the Y direction.

After detecting the home position in S1, in S3 the CPU 6 controls the CIS 40 to read the reading range AR including the reference hole 50 while the CPU 6 controls the CIS 40 to move in the sub scanning direction (the Y direction) from the home position HP (Y=0), so as to store image data of a read image in the RAM 8. The process of S3 performed by the CPU 6 is an example of the reading process.

In S4 the CPU 6 detects coordinate information of the reference point KP1 the reference hole 50 based on the image data which represents an image of the reading range AR including the reference hole 50 and is stored in the RAM 8 in the process of S3. The coordinate information of the reference point KP1 indicates coordinates of the reference point KP1 when the coordinates (X=0, Y=0) are set as the origin. The details of the process of S4 will be described below.

The CPU 6 performs an edge enhancement process on the image data stored in the RAM 8 in S3. In the edge enhancement process, the CPU 6 multiplies a pixel value by a corresponding prescribed filter coefficient for each of a target pixel and peripheral pixels of the target pixel in the image data. Accordingly, a density of a pixel is enhanced for each pixel which is strongly related to peripheral pixels in both the vertical direction and the horizontal direction, whereby a portion of pixels having high continuity is enhanced.

The CPU 6 performs a binarization process on image data obtained after the edge enhancement process is executed. In the binarization process, the CPU 6 sets the pixel value of the target pixel to "1" in a case that the density of the target pixel is larger than or equal to a prescribed threshold value, whereas sets the pixel value of the target pixel to "0" in a case that the density of the target pixel is smaller than the prescribed threshold value. The CPU 6 performs a black and white reversal process on image data which is obtained after the binarization process is executed.

Figure 7:
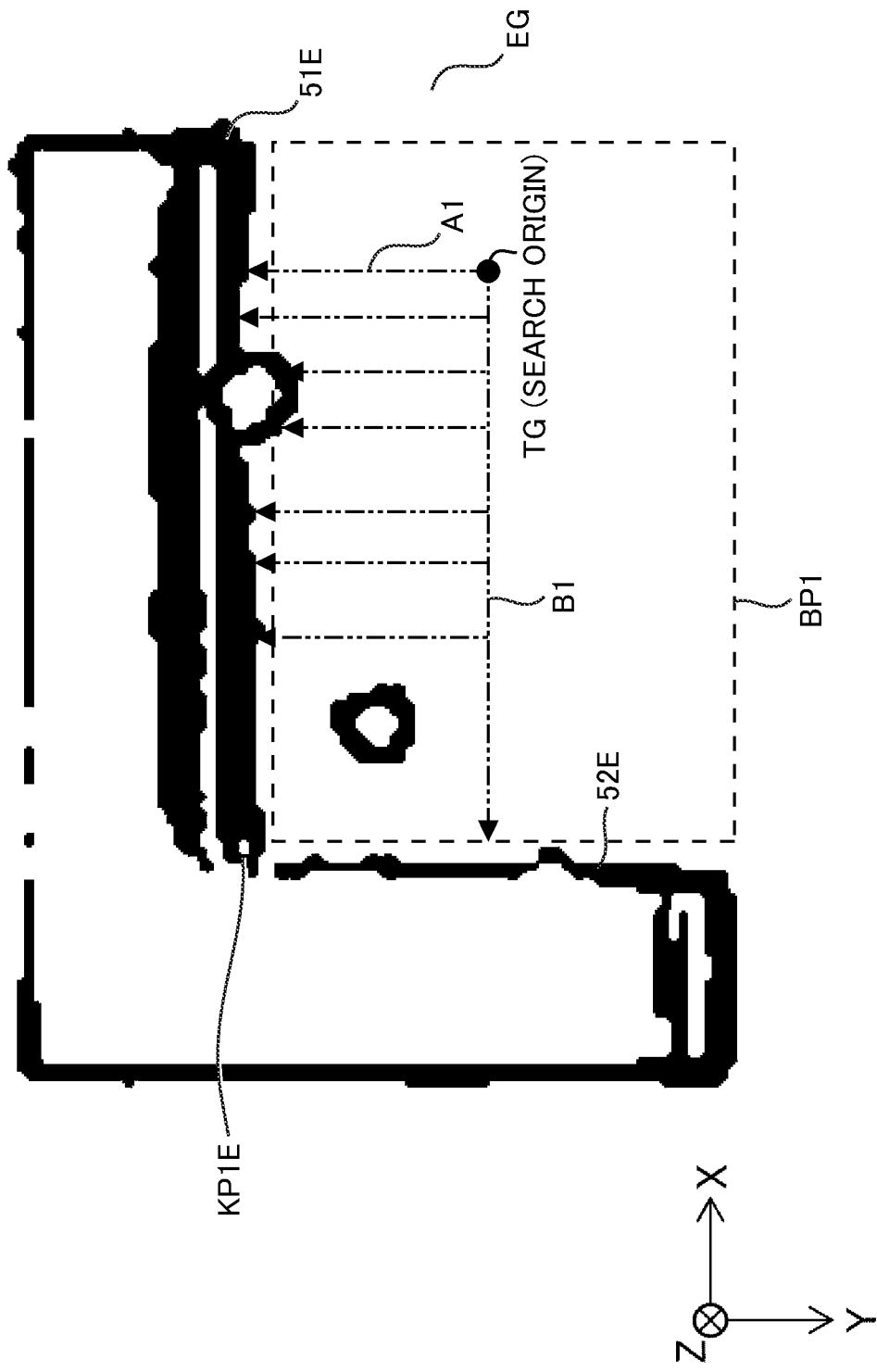
FIG. 7 is an explanatory diagram illustrating an edge image which is obtained after an edge enhancement process is executed based on reading results of a reading range including a reference hole.

FIG. 7 is an explanatory diagram illustrating an edge image EG which is an image obtained after the white black and white reversal process is performed and based on reading results of the reading range AR including the reference hole 50. The edge image EG represents edges of the reference hole 50 by the black line of a group of pixels having pixel values "1". The edge image EG includes black circle lines which represent results by reading dusts on the peripheral member 30. In the edge image EG, the pixel values "0" represents pixels other than the edges of the reference hole 50 and other than the dusts on the peripheral member 30.

The CPU 6 sets a search origin TG to a position within the reading range AR, that is, the range of the edge image EG and outside the reference hole 50, so as to detect the position of the first edge 51 and the position of the second edge 52 in the reference hole 50. Specifically, the search origin TG is set at the position so that the search origin TG is outside the reference hole 50 and inside of a bent part BP1 partitioned by an L-shape line formed by the first edge 51 and the second edge 52. Here, the bent part BP1 is an imaginary rectangular region having the first edge 51 as a top side, the second edge 52 as a left side, a bottom side which is parallel to the first edge 51 and intersects with a free end of the second edge 52, and a right side which is parallel to the second edge 52 and intersects with a free end of the first edge 51. Note that at this stage, the CPU 6 does not detect accurate positions of the first edge 51 and the second edge 52 in the edge image. So, the bent part BP1 is loosely set as a target area in the edge image EG. For example, the top side of the bent part BP1 may not match the first edge 51, the left side of the bent part BP1 may not match the second edge, a horizontal length of the bent part BP1 may not match the length of the first edge 51E, or a vertical length of the bent part BP1 may not match the length of the second edge 51.

In other words, the search origin TO is set so that a fan shape formed by the first edge 51, the second edge 52, and an imaginary circular arc crossing the TG has a central angle smaller than 180 degrees. In the embodiment, the center angle of the fan shape has substantially 90 degrees. Since accurate positions of the first edge 51 and the second edge 52 are not detected at this stage, the CPU 6 may provisionally and loosely set an area including the first edge 51 and the second edge 52 in the image data, and set the search origin TG so that the search origin TG is outside the reference hole 50 and inside of the bent part BP1 estimated from the provisionally set area. In this case, the provisionally set area may be a preset area determined in an area of the edge image. In the embodiment, the search origin TG is set so that the search origin is, at least, positioned below the first edge 51 and right side of the second edge 52, as shown in FIG. 7. Note, the image data is read in S3 so that the search origin TG can be set in the reading range AR.

The CPU 6 searches pixels toward the negative direction of the Y direction shown in an arrow A1 in FIG. 7 from the search origin TG so as to determine a position of the first edge 51E in an edge image EG obtained after the black and white reversal process is executed. In a case that the CPU 6 firstly finds a pixel having a pixel value "1" while searching pixels in the negative direction of the Y direction, the CPU 6 sets the firstly found pixel as a candidate pixel of pixels for configuring the first edge 51E. Further, the CPU 6 sets a next search origin shifted by a prescribed distance in the negative direction of the X direction from the initial search origin TG, and searches pixels in the negative direction of the Y direction as shown in the arrow A1 from the shifted search origin. In a case that the CPU 6 firstly finds a pixel having a pixel value "1" while searching pixels from the shifted search origin, the CPU 6 sets the firstly found pixel in this search as a candidate pixel of a pixel configuring the first edge 51E. While sequentially shifting a search origin by the prescribed distance in the negative direction of the X direction, the CPU 6 repeatedly determines a candidate pixel for the first edge 51E. Accordingly, the CPU 6 sets the plurality of candidate pixels for the first edge 51E.

The CPU 6 generates a frequency distribution such as a histogram for Y coordinates of the found candidate pixels for the first edge 51E, extracts a prescribed range of Y coordinates from the frequency distribution, calculates an average of the Y coordinates in the prescribed range, and determines the average as a Y coordinate of the first edge 51E, that is, a Y coordinate of the first edge 51 of the reference hole 50. Here, the prescribed range may be a range of Y coordinate in which, for each Y coordinate, a frequency of the candidate pixels is larger than or equal to a prescribed value. By extracting the pixels in the prescribed range having the large frequency, pixels corresponding to dusts on the peripheral member 30 are prevented from being set as the first edge 51E.

Next, the CPU 6 searches pixels toward the negative direction of the X direction shown in an arrow B1 in FIG. 7 from the search origin. TG so as to determine the position of a second edge 52E in the edge image EG obtained after the black and white reversal process is executed. In a ease that the CPU 6 firstly finds a pixel having a pixel value "1" while searching pixels in the negative direction of the X direction, the CPU 6 sets the firstly found pixel as a candidate pixel of pixels for configuring the second edge 52E. Further, the CPU 6 sets a next search origin shifted by a prescribed distance in the negative direction of the Y direction from the search origin TG, and searches pixels in the negative direction of the X direction as shown in the arrow B1 from the shifted search origin. In a case that the CPU 6 firstly finds a pixel having a pixel value "1" while searching pixels from the shifted search origin, the CPU 6 sets the firstly found pixel in this search as a candidate pixel of a pixel configuring the second edge 52E. While sequentially shifting a search origin by the prescribed distance in the negative direction of the Y direction, the CPU 6 repeatedly determines a candidate pixel for the second edge 52E. Accordingly, the CPU 6 sets the plurality of candidate pixels for the second edge 52E.

The CPU 6 generates a frequency distribution such as a histogram for X coordinates of the found candidate pixels for the second edge 52E, extracts a prescribed range of X coordinates from the frequency distribution, calculates an average of the extracted X coordinates in the prescribed range, and determines the average as an X coordinate of the second edge 52E, that is, an X coordinate of the second edge 52 of the reference hole 50. Here, the prescribed range may be a range of X coordinate in which, for each X coordinate, a frequency of the candidate pixels is larger than or equal to a prescribed value.

The CPU 6 sets the determined Y coordinate of the first edge 51 as a Y coordinate of the reference point KP1, and sets the determined X coordinate of the second edge 52 as an X coordinate of the reference point KP1. That is, the CPU 6 determines the coordinates of the reference point KP1.

An extending direction of at least one of the first edge 51 and the second edge 52 may be inclined from both the X direction and the Y direction. The angle formed by the first edge 51 and the second edge 52 may not be the right angle, but an acute angle or an obtuse angle. In this case, in S4 the CPU 6 searches pixels in a predetermined direction which is the same as the extending direction of the second edge 52 to detect the position of the second edge 51, and searches pixels in a predetermined direction which is the same as the extending direction of the first edge 51 to detect the position of the second edge 52.

In S5 the CPU 6 calculates the calibration value HV based on the Y coordinate of the detected reference point KP1 and the distance LR from the designed home position HPR to the reference point KP1, as shown in the following expression (eq. 1).

(calibration value $HV$)=($Y$ coordinate of the reference point $KP1$)−(distance $LR$)  (eq. 1)

The CPU 6 calculates the calibration value HV by subtracting the distance LR from the determined Y coordinate of the reference point KP1.

The CPU 6 stores the calibration value HV calculated in the process of S5 in the NVRAM 9. Note that the distance LR from the designed home position HPR to the reference point KP1 is stored in the ROM 7 in advance.

FIG. 8 is a cross section illustrating a state that the reference hole 50 is irradiated by light propagating in an inclined direction from the light source included in the CIS 40. As shown in FIG. 8, the CIS 40 includes the light guide 41 and the photoelectric conversion elements 42. The reference hole 50 is irradiated obliquely by the light from the light guide 41.

Figure 9:
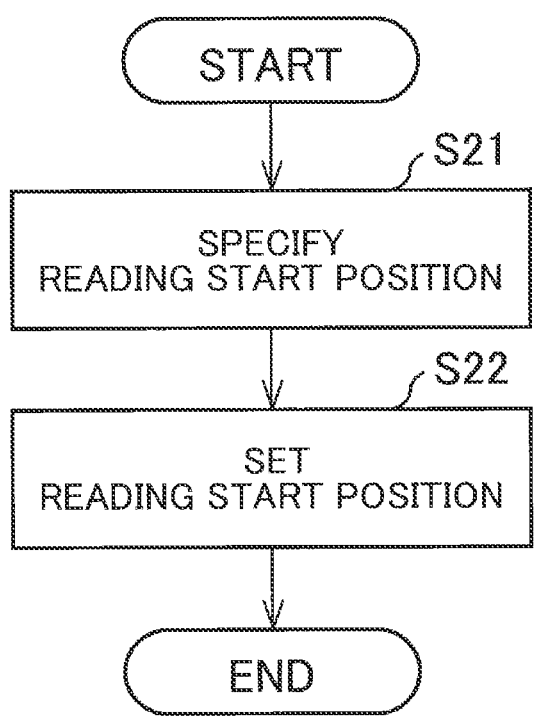
FIG. 9 is a flowchart illustrating a reading process of an original executed by the reading device.

FIG. 9 is a flowchart illustrating the reading process of the original MS executed by the reading device 1. In a case that the original MS is read from the reading start position YP (FIG. 2) which is the edge portion of the light transmissive member 20 in the Y direction, the reading device 1 need to acquire an actual distance DI (FIG. 2) from the home position HP to the reading start position YP.

As shown in FIG. 9, in S21 the CPU 6 specifies the Y coordinate of the reading start position YP from which the CIS 40 starts reading, according to the method described below. The ROM 7 stores in advance information on a distance LKY between the reference point KP1 and the light transmissive member 20 in the Y direction (see FIG. 5B). There is little variation in the distance LKY between the actual reading devices 1 and a designed reading device 1, and thus the deviation is negligible.

In S22 the CPU 6 sets the Y coordinate of the reading start position YP from the coordinate of the origin of the home position HP by adding the distance LKY to the Y coordinate of the reference point KP1. Here, the Y coordinate of the reference point KP1 may be obtained by adding the calibration value HV to the distance LR stored in the ROM 7.

Accordingly, the CPU 6 can precisely set the Y coordinate of the reading start position YP even if the position of the taped reference member 60 is deviated from the designed position which is a predetermined position.

Because the CPU 6 sets the reading start position YP by using coordinate information on the reference point KP1 which is determined in the process of S4, the CPU 6 specifies the reading start position YP by the positions of the first edge 51 and the second edge 52 read by the CIS 40.

After the process of S22, the CPU 6 outputs a control signal to control CIS 40 to read the original MS located on the front surface 21 of the light transmissive member 20 from the reading start position YP set in the process of S22.

In the conventional reading device, in a case that a reference hole has a rectangular shape, it is necessary to set a search origin outside the reference hole in order to search first and second edges. In this case, a peripheral member of the reading device need to be large because the peripheral member is required to have a space for setting the search origin. On the other hand, according to the embodiment, the shape of the reading device 1 is the L-shape, and the search origin TG is set inside of the bent part BP1 partitioned by the L-shape formed by the first edge 51 and the second edge 52. Accordingly, in the reading device 1 including the L-shaped reference hole 50, the size of the peripheral member 30 can be reduced compared to a case that a reading device having a rectangular reference hole.

Let us presume a case that the reading start position YP, which is the edge portion of the light transmissive member 20, is set as a start position from which the CIS 40 reads the original MS in the settings for reading the original MS as described above, and the taped position of the reference member 60 is deviated from a desired position. Even in this case, since the CIS 40 previously reads the first edge 51 and the second edge 52, it is prevented that the CIS 40 reads the peripheral member 30 outside the original MS when reading the original MS.

The first edge 51 extends in the X direction and the second edge 52 extends in the Y direction in the reading device 1. Thus, enough lengths for enabling searching the reference hole 50 in both the X direction and the Y direction can be secured for the process of S4. Accordingly, even if foreign material is attached on periphery of the reference hole, the CPU 6 can more surely detect the positions of the first edge 51 and the second edge 52 than a case that a rectangular reference hole having at least one short edge in the X direction or the Y direction is read.

Second Embodiment

Next, a reading device 1 according to a second embodiment will be described, wherein like parts and components are designated with the same reference numerals to avoid duplicating description. FIG. 10 is a schematic diagram illustrating a configuration of a reference hole 50A formed in a back surface 31 of a peripheral member 30 provided in the reading device 1.

As shown in FIG. 10, the reference hole 50A has a substantially T shape including a first edge 51 and a second edge 52. For the reference hole 50A having the substantially T shape, the CPU 6 sets a search origin TG outside the reference hole 50A and inside a bent part BP2 partitioned by the L-shape formed by the first edge 51 and the second edge 52 in obtained image data. The bent part BP2 is set similarly to the bent part BP1 of the embodiment. Here, a reference point KP2 is set as an intersection between the first edge 51 and the second edge 52. According to the same method in the first embodiment, the CPU 6 can specify the coordinates of the reference point KP2 by specifying the positions of the first edge 51 and the second edge 52 based on search from the search origin TG.

Third Embodiment

Figure 11A:
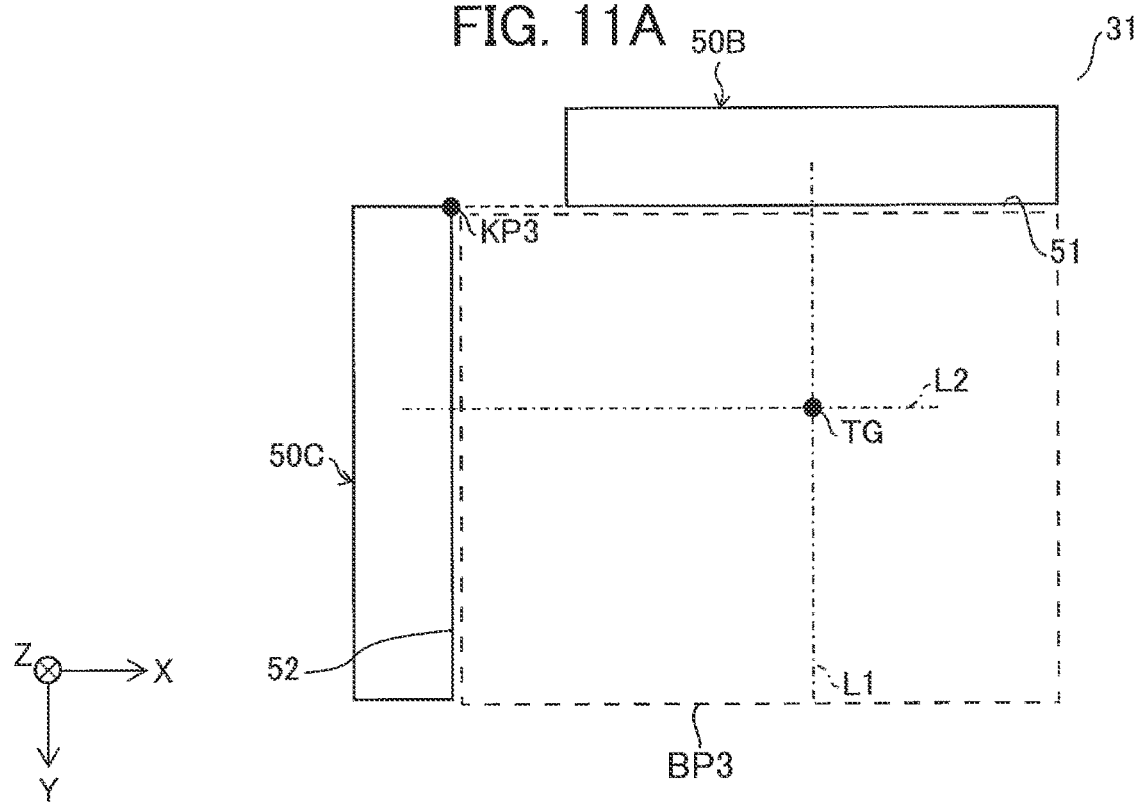
FIG. 11A and FIG. 11B are schematic diagrams of two examples of two reference holes formed in a back surface of a peripheral member provided in a reading device.
Figure 11B:
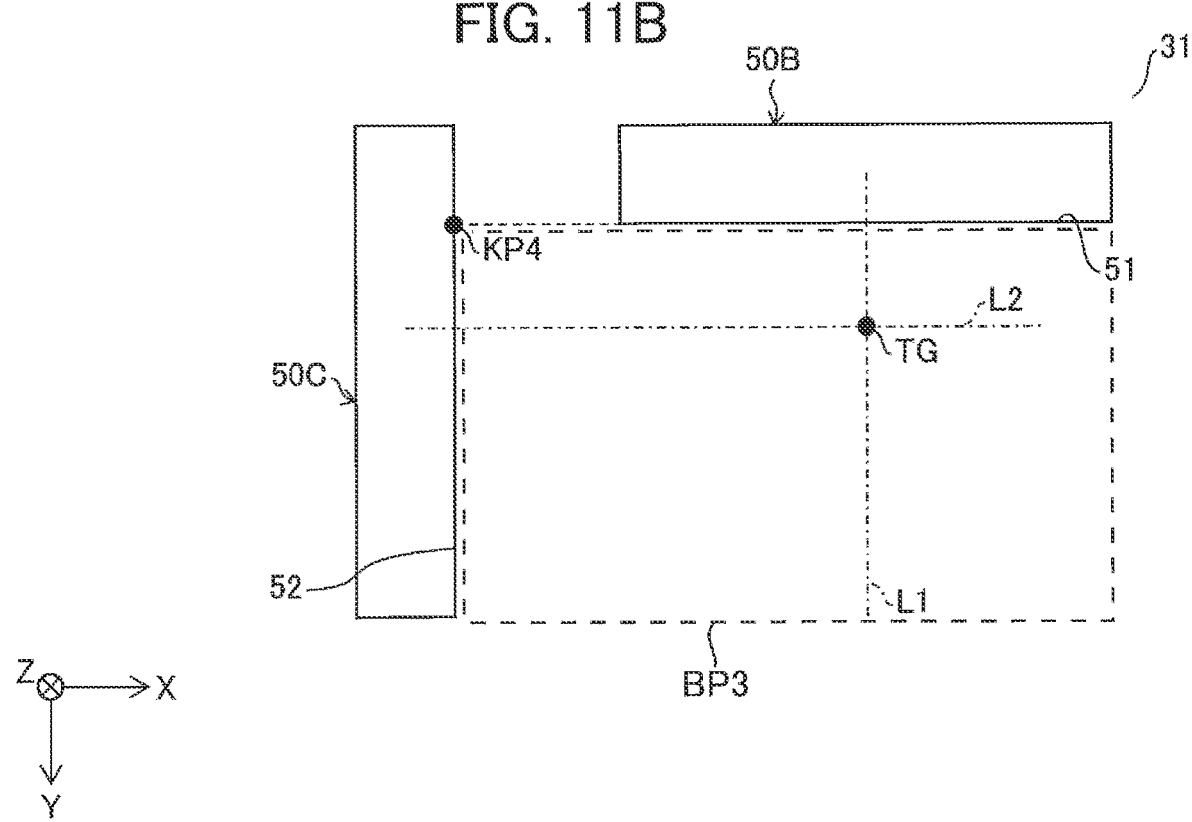

Next, a reading device 1 according to a third embodiment will be described, wherein like parts and components are designated with the same reference numerals to avoid duplicating description. In the third embodiment, two reference holes 50A and 50B are formed in a back surface 31 of a peripheral member 30 provided in the reading device 1. FIG. 11A and FIG. 11B are schematic diagrams of the two different examples according to the third embodiment of the reading device 1. Though the two reference holes 50A and 50B are provided in each of the two examples, the positional relation between these two reference holes 50A and 50B is different between the two examples, as described later.

As shown in FIGS. 11A and 11B, the first reference hole 50B and the second reference hole 50C are provided in the back surface 31 of the peripheral member 30. The first reference hole 50B includes a first edge 51, and the second reference hole 50C includes a second edge 52. Each of reference points KP3 (FIG. 11A) and KP4 (FIG. 11B) is an intersection between the first edge 51 and the second edge 52. In each of the two cases, a search origin TG is set as an intersection between a first line L1 and a second line L2. Here, the first line L1 orthogonally crosses the first edge 51, and the second line L2 orthogonally crosses the second edge 52. In the examples shown in FIGS. 11A and 11B, an extended line of the first edge 51 in the first reference hole 50B and an extended line of the second edge 52 in the second reference hole 50C forms a substantially L-shape. Specifically, in the example shown in FIG. 11A, the extended line of the first edge 51 in the first reference hole 50B and the second edge 52 in the second reference hole 50C forms a substantially L-shape. In the example shown in FIG. 11B, the extended line of the first edge 51 in the first reference hole 50B and a part of the second edge 52 in the second reference hole 50C forms a substantially L-shape. The search origin TG is set inside a bent part BP3 partitioned by the L-shape in obtained image data. The bent part BP3 is set similarly to the bent part BP1 of the embodiment. The extended line of the first edge 51 is orthogonal to the extended line of the second edge 52.

According to the same method of the first embodiment, for each of the examples shown in FIGS. 11A and 11B, the CPU 6 can specify a corresponding one of the reference points KP3 and KP4 by specifying the positions of the first edge 51 and the second edge 52 based on search from the search origin TG.

As shown in FIG. 11A, the first reference hole 50B may be located in downstream side of the second reference hole 50C in the negative direction of the Y direction. In this case, the first edge 51 and the second edge 52 are arranged so that the Y coordinate of the first edge 51 is coincident with a minimum Y coordinate of the second edge 52. As shown in FIG. 11B, a range of the circumference of the first reference hole 50B with respect to the Y direction may be at least partially overlapped with a range of the circumference of the second reference hole 50C with respect to the Y direction. In other words, when the region defined by the circumference of the first reference hole 50B and the region defined by the circumference of the second reference hole 50C are projected on the Y axis, these two regions may be at least partially overlapped with each other. Further, the first reference hole SOB and the second reference hole 50C may be in communication with each other through one point.

In the examples shown in FIGS. 11A and 11B, each of the first reference holes 50B and 50C has a rectangular shape. However, the shapes of the first reference holes 50B and 50C are not limited to the rectangular shape. The shapes of the first reference holes 50B and 50C may be any shapes provided that two reference holes are formed. For example, the shape of each of the first reference holes 50B and 50C may be trapezoid or semicircle.

In the reading device 1, the main body 11 may include an image forming portion (print engine) to form an image on a sheet. In the embodiments, the deviation of the home position HP in the sub scanning direction (the Y direction) is calibrated. The concept or method of the embodiments can be applied to a case to calibrate the home position HP in the main scanning direction (the X direction).

While the disclosure has been described in detail with reference to the specific embodiment thereof, it would be apparent to those skilled in the art that various changes and modifications may be made therein without departing from the scope of the invention.

What is claimed is:

1. A reading device comprising:
   a light transmissive plate having a front surface on which an original is placed, and a back surface;
   a peripheral frame located adjacent to the light transmissive plate, the peripheral frame including a hack surface in which a reference hole is formed, the reference hole having first and second segment, the first segment including first inside edge and the second segment including a second inside edge intersecting with the first inside edge at an angle to define an inside part of the reference hole;
   a reading sensor provided to face the back surface of the light transmissive plate and the back surface of the peripheral frame, the reading sensor being configured to read an image while moving over a range including the light transmissive plate and the peripheral frame; and a controller configured to perform:
controlling the reading sensor to read a reading range including the reference hole to obtain a read image;
determining a reference position in the reading range based on the read image obtained in the controlling, the reference position being determined to an intersection between the first inside edge and the second inside edge; and
setting a reading start position based on the reference position in the reading range, the reading start position being a position from which the reading sensor starts moving when the reading sensor reads the original.

2. The reading device according to claim 1, wherein the first inside edge and the second inside edge intersect with each other at a right angle.

3. The reading device according to claim 1, wherein the reference hole includes a T-shape including the first inside edge and the second inside edge.

4. The reading device according to claim 1, wherein the controller is configured to further perform:
setting a search origin outside the reference hole and within a bent side of the first inside edge and the second inside edge, wherein the reading range is read in the controlling so that the reading range includes the reference hole and the search origin; and
searching a position of the first inside edge and a position of the second inside edge from the set search origin by using the read image obtained in the controlling to find the reference position.

5. The reading device according to claim 1, wherein the controller is configured to further perform:
setting a search origin so that a fan shape formed by the first inside edge, the second inside edge, and a circular arc crossing the search origin has a central angle smaller than 180 degrees, wherein the reading range is read in the controlling so that the reading range includes the reference hole and the search origin; and
searching a position of the first inside edge and a position of the second inside edge from the set search origin by using the read image obtained in the controlling to find the reference position.

6. The reading device according to claim 1, wherein the reference hole further includes an outside edge to define an outside part of the reference hole,
wherein the first inside edge and the second inside edge are smaller than the outside edge.

7. The reading device according to claim 1, wherein reference hole includes an L-shape including the first inside edge and the second inside edge.

8. The reading device according to claim 1, wherein the reading sensor includes a contact image sensor,
wherein the contact image sensor includes:
a light source configured to emit light and located at one end side of a light guide in a main scanning direction;
the light guide extending in the main scanning direction and configured to guide emitted light from the light source in the main scanning direction; and
a line sensor configured to receive reflection light which is emitted from the light source and reflected by the peripheral frame or the original placed on the light transmissive plate.

9. The reading device according to claim 1, wherein the light transmissive plate is a platen glass.

10. The reading device according to claim 1, wherein the peripheral frame supports and surrounds a periphery of the light transmissive plate.

11. The reading device according to claim 1, further comprising a motor configured to move the reading sensor in a sub scanning direction.

12. The reading device according to claim 1, further comprising a motor configured to move the reading sensor in a sub scanning direction,
wherein the reading sensor is configured to move in the sub scanning direction below the light transmissive plate and the peripheral frame by rotation of the motor.

13. A reading device comprising:
a light transmissive plate having a front surface on which an original is placed, and a back surface;
a peripheral frame located adjacent to the light transmissive plate, the peripheral frame including a back surface in which a reference hole is formed, the reference hole having first and second segments, the first segment including a first inside edge and the second segment including a second inside edge intersecting with the first inside edge at an angle to define an inside part of the reference hole, an intersection between the first inside edge and the second inside edge being a reference position; and
a reading sensor provided to face the back surface of the light transmissive plate and the back surface of the peripheral frame, the reading sensor being configured to read an image while moving over a range including the light transmissive plate and the peripheral frame,
wherein a reading start position is defined based on the reference position in the range.

* * * * *